United States Patent Office 3,615,098
Patented Oct. 26, 1971

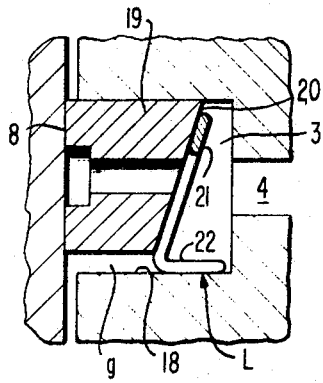
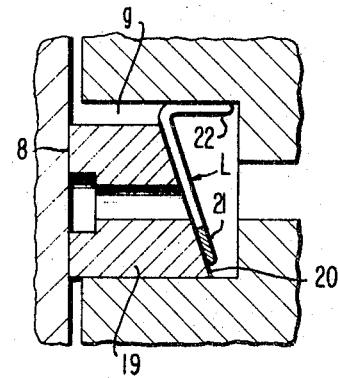
FIG. 5          FIG. 6
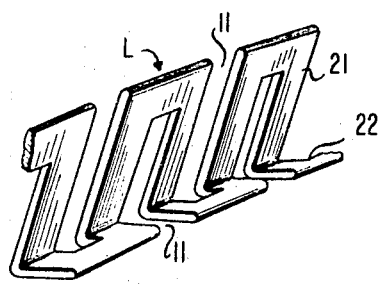
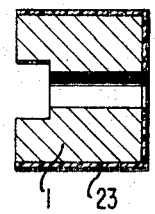
FIG. 7          FIG. 8
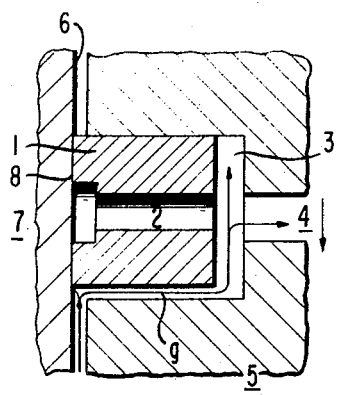
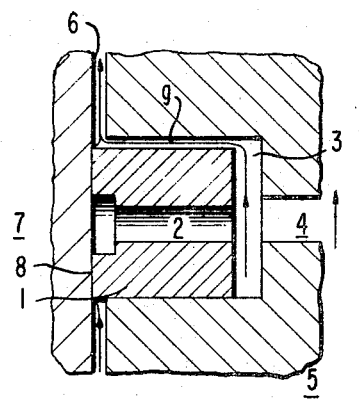
FIG. 9a (PRIOR ART)          FIG. 9b (PRIOR ART)

3,615,098
OIL SCRAPING PISTON-RING ASSEMBLY
Eisuke Sugahara, Tokyo, Japan, assignor to Nippon
Piston Ring Co., Ltd., Tokyo, Japan
Filed Mar. 26, 1970, Ser. No. 22,959
Claims priority, application Japan, May 19, 1969,
44/37,991
Int. Cl. F16j 9/06
U.S. Cl. 277—143                                    4 Claims

ABSTRACT OF THE DISCLOSURE

An oil scraping piston-ring assembly which has its piston-ring internal surface disposed perpendicular to the upper or lower surface thereof or inclined upwardly or downwardly. A compression element of steel strip material has a plurality of oil passing slits and is formed into a ring having a cross-sectional configuration of either V or L shape. The compression element has two portions, one rising vertically or obliquely and the other extending obliquely outwardly or horizontally outwardly. When the piston-ring is assembled with the compression element and is inserted in a piston groove, the compressive forces between the sliding surface of the oil scraping piston-ring and the inside surface of the cylinder and also between the upper or lower surface of the piston groove and the corresponding surface of the piston-ring are greatly strengthened and the leakage of the lubricating oil therethrough into the combustion chamber is substantially decreased.

BACKGROUND OF THE INVENTION

Field of the invention

This invention relates generally to oil scraping piston-rings, and more particularly to the type wherein a separate compression element made of steel strip is employed in combination therewith.

Description of the prior art

In an internal combustion engine, the function of the oil scraping piston-ring is to scrape off an excessive amount of lubricating oil from the surface of the cylinder to thus control the amount of lubrication oil. To be more specific, an excessive amount of lubricating oil is scraped off by means of the oil scraping piston-ring so that a suitable amount of oil is always maintained between the piston and the cylinder but no part of the oil is permitted to intrude into the combustion chamber. The formation of sludge on the inside surfaces of the cylinder head and other portions is thereby prevented.

However, if the above-described function of the oil scraping piston-ring is not accomplished, a part of the lubricating oil leaks into the combustion chamber, and not only is the consumption of the lubricating oil increased, but also sludge is formed inside of the combustion chamber and the operational characteristics of the internal combustion engine are remarkably degraded.

Furthermore, as a result of the recent progress in internal combustion engines, the running speed and the output thereof are more and more increased, and the demand for a higher performance oil scraping piston-ring is more urgent.

However, conventional oil scraping piston-rings have hardly exhibited a sufficient compressive force onto the interior surface of the cylinder when they are employed without assistance of other elements, and as a result, there is a difficulty in obtaining sufficient oil scraping effect or oil intrusion preventing effect into the combustion chamber.

When the oil scraping behavior of the conventional oil scraping piston-ring is considered with reference to FIG. 9, which will be described hereinafter, in the case where the piston 5 is descending as shown in FIG. 9(a), the piston-ring main body 1 having an oil passage hole 2 provided at an intermediate portion thereof is shifted in a groove 3 around the piston 5 in such a manner that the upper surface of the piston-ring main body 1 is urged against the upper surface of the groove 3. The lubricating oil scraped by the piston-ring then passes into a clearance $g$ formed between the under surface of the piston-ring main body 1 and the lower surface of the groove 3 as indicated by the long arrow. For this reason, lubricating oil is partly delivered through a discharge hole 4 provided in the piston 5 and part remains in a space formed between the rear surface of the piston-ring main body 1 and the bottom surface of the piston groove 3. Furthermore, another part of the lubricating oil leaks upward in the arrowed direction to the combustion chamber through a minute gap created between the inside surface 6 of the cylinder and the sliding surface 8 of the piston-ring main body 1.

On the contrary, when the piston 5 is in its upstroke as shown in FIG. 9(b), it is seen that the piston-ring 1 shifts to the lower side surface of the groove 3 and the lubricating oil, which has been scraped and partly remains in the space at the bottom of the groove 3, now passes through the clearance $g$ created between the piston-ring and the upper surface of the groove by means of so-called pumping action. At the same time, the upward leakage of the lubricating oil through the minute gap between the inside surface 6 of the cylinder, the sliding surface 8 of the piston-ring is also inevitable, as in the case of descent of the piston 5.

Since the upstroke and downstroke of the piston 5 are repeated at extremely high speed, lubricating oil in the case of the conventional piston-ring is forced into the combustion chamber as described above, and not only is the consumption of the lubricating oil increased, but the lubricating oil leaking into the combustion chamber is carbonized by the high temperature of the combustion chamber and deposited on nearby surfaces of the combustion chamber, whereby the function of the internal combustion engine significantly deteriorates.

SUMMARY OF THE INVENTION

The present invention provides an improved oil scraping piston-ring whereby the above-described drawbacks of the conventional oil scraping piston rings can be substantially eliminated. The present invention further provides a novel combination of an oil scraping piston ring and a separate compression element which is simple in construction and economical in manufacture.

In the novel type of composite oil scraping piston-ring assembly, the compressive forces between the sliding surface of the oil scraping piston ring and inside surface of the cylinder and also between the piston ring main body and the upper or lower surface of the piston groove are substantially strengthened. A part of lubricating oil scraped by the oil scraping piston ring is passed through a clearance between one side of the oil scraping piston ring and the opposing side of the surface of the groove and into an oil discharging hole provided through the piston.

The present invention also provides a novel type of compression element combined with the oil scraping piston-ring main body, which element is made of a steel strip capable of constantly compressing the oil scraping piston ring main body strongly onto the inside surface of the cylinder and also onto the upper or lower surface of the piston groove.

The composite oil scraping piston-ring assembly, in one aspect of the invention, comprises an oil scraping piston ring main body having an inner surface thereof perpendicular to the upper or lower surface of the piston ring main body. A compression element made of a thin steel strip is bent into a ring form, having a number of oil passing slits, and formed into a V-shaped cross-sectional configuration having a vertically rising portion and an inclined radially outwardly extending portion. Thus, when the oil scraping piston ring is inserted into the piston groove, the compression element is assembled with the oil scraping piston ring in such a manner that the vertically rising portion thereof is placed against the inner surface of the piston ring main body and the radially outwardly extending portion contacts the lower or upper surface of the piston ring main body.

According to another aspect of the present invention, the oil scraping piston-ring assembly comprises an oil scraping piston ring main body having an inner surface thereof slanted obliquely so that it extends upwardly and outwardly or downwardly and outwardly. A compression element made of a thin steel strip, bent into a ring form having a number of oil passing slits, and formed into an L-shaped cross-sectional configuration has an upwardly and radially outwardly rising portion and a horizontally and radially outwardly extending portion. Thus, when the oil scraping piston ring is inserted into the piston groove, the compression element is assembled with the oil scraping piston ring in such a manner that the obliquely rising portion thereof is placed against the inner surface of the piston ring main body inclined upwardly and the radially outwardly extending portion thereof contacts the lower surface of the piston ring main body. The reverse of this arrangement may occur.

BRIEF DESCRIPTION OF THE DRAWINGS

In the drawings:

FIGS. 5 and 6 are partial sectional views similar to FIGS. 1 to 2 and showing, in a much enlarged scale, different applications of another type of oil scraping piston-ring assembly constituting a second embodiment of the present invention;

FIG. 7 is a perspective view of one part of the L-shaped compression element in accordance with the second aspect of the present invention;

FIG. 8 is a sectional view of an oil scraping piston ring main body employed in the first embodiment of the invention having on the upper, lower and the rear side surfaces an antiwear plating;

FIGS. 9(a) and 9(b) are partial longitudinal sectional views of a conventional cast iron oil scraping piston ring inserted in a piston groove, and showing respectively the passages of the lubricating oil at the times of the descent and elevation of the piston.

DETAILED DESCRIPTION OF PREFERRED EMODIMENTS

Referring first to FIGS. 1 through 4, the V-shaped, ring-formed compression element which constitutes one part of the first embodiment of the present invention will be explained.

Figure 2:
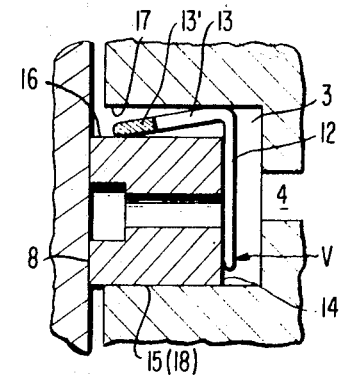
Figure 3:
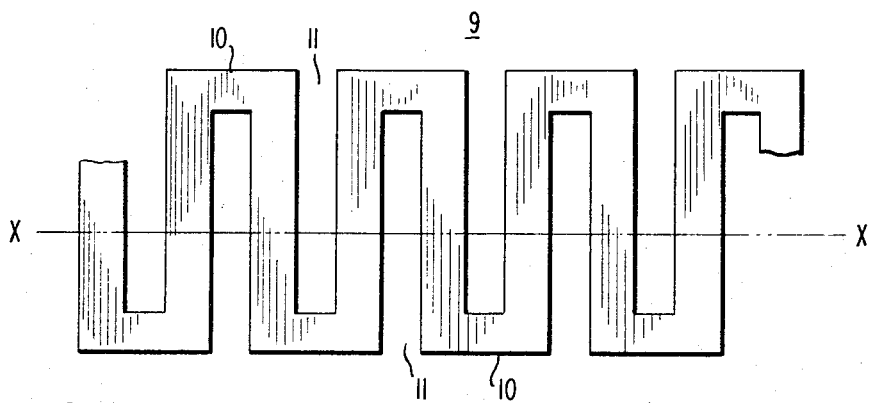
FIG. 3 is a plan view of one part of a steel strip which is thereafter converted into a V-shaped compression element in accordance with the first aspect of the present invention.
Figure 4:
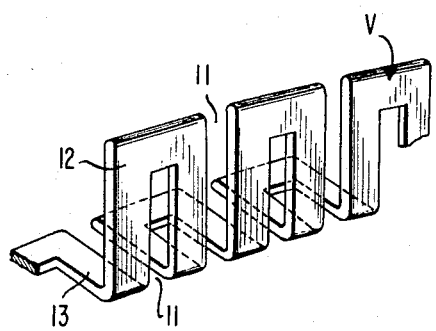
FIG. 4 is a perspective view of one part of the V-shaped compression element in accordance with the first aspect of the present invention.

A thin steel strip 9 as exemplarily shown in FIG. 3 is punched so that a number of equivalent rectangular slits 11, 11, . . . alternately open toward either sides 10, 10 thereof for providing passages of lubricating oil. The thin steel strip 9, as thus formed, is bent along an $x-x$ line passing a little lower than the center line, into V-shaped cross-sectional configuration, and is cut into a length adapted to the size of the oil scraping piston ring with which the V-shaped compression element is to be assembled. The V-shaped compression element, thus cut into suitable length, is then formed into a ring and the ends thereof abut together so that a compression element V, as shown in FIGS. 1, 2 and 4 having a vertically rising portion 12 and an outwardly extending inclined portion 13 is obtained.

When the V-shaped compression element V is inserted into a groove 3 together with the oil scraping piston ring 1, the vertical portion 12 of the compression element fully contacts and extends along the vertical rear-side surface 14 of the piston ring main body. The outwardly extending inclined portion 13 of the compression element V may either extend along the lower surface 15 of the piston ring may body 1 as shown in FIG. 1 or along the upper surface 16 thereof as shown in FIG. 2. In both of the cases, it is so designed that the oil scraping piston ring main body 1 is pushed outwardly toward the internal surface 6 of the cylinder by means of the resilience of the compression element V so that the compressive force applied at the sliding surface 8 of the piston ring main body 1 is substantially increased. Furthermore, in the case of FIG. 1, the oil scraping piston ring main body 1 is pushed upwards by means of the outermost edge 13a of the outwardly extending portion 13 of the V-shaped compression element V, whereby the upper surface 16 of the piston ring main body 1 tightly fits against the upper side surface 17 of the groove 3. In the case of FIG. 2, the piston ring main body 1 is pushed downwardly by means of the outermost edge 13a of the outwardly extending portion 13 of the V-shaped compression element V, and the lower surface 15 of the piston ring main body 1 is continuously and tightly urged toward the lower side surface 18 of the groove 3.

Further, if the upper, lower and the rear side surfaces of the oil scraping piston ring main body 1 carry an applied lawer of tetrafluoroethylene resin or hard chrome plating as shown in FIG. 8, friction between the piston ing main body 1 and the compression element V can be significantly reduced, and the contact between the piston ring main body 1 and the surfaces of the piston groove can be made tighter and smooth so that the advantageous effect of employing the compression element may be far more enhanced.

Figure 1:
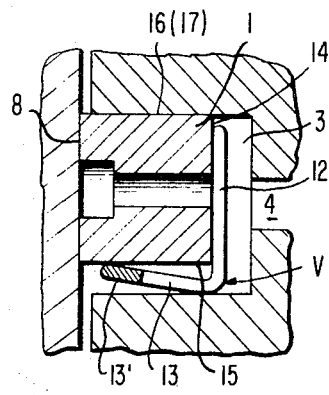
FIGS. 1 and 2 are partial sectional views taken along the longitudinal axis of a piston and a cylinder and showing in a much enlarged scale different applications of an oil scraping piston-ring assembly constituting the first embodiment of the present invention.

When the upper surface 16 of the piston ring main body 1 is continuously and tightly compressed to the upper side surface 17 of the piston groove 3 and also the sliding surface 8 of the piston ring main body 1 strongly compressed to the inner surface 6 of the cylinder as shown in FIG. 1, a clearance $g$ is not created at the upper surface 16 of the piston ring main body 1 even when the piston is ascending as is the case of the conventional piston ring (see FIG. 9(b)). This prevents the intrusion of lubricating oil into the combustion chamber through a clearance $g$, and because of the strengthened compression of the sliding surface 8 to the inner surface of the cylinder, leakage of lubricating oil through the clearance therebetween is also substantially eliminated.

Likewise, when the lower surface 15 of the piston ring main body 1 is continuously and tightly compressed onto the lower side surface 18 of the piston groove 3 and also the sliding surface of the piston ring main body 1 is strongly compressed onto the inner surface 6 of the cylinder as shown in FIG. 1, a clearance $g$ is not created at the lower surface 15 of the piston ring main body as is the case with the conventional piston ring (see FIG. 9(a)). Even in the case of the piston descending, the intrusion of lubricating oil into the combustion chamber through the clearance $g$ and also through the gap between the sliding surface 8 and the inner surface 6 of the cylinder is substantially eliminated.

As is apparent from the above description, the intrusion of lubricating oil into the combustion chamber due to the pumping action caused by the intensely repeated up-and-down movements of the piston and also due to the insufficient compression between the sliding surface of the piston ring main body and inner surface of the cylinder can be substantially eliminated by putting the first embodiment of the present invention into practice. Not only is the deposition of carbon in the combustion chamber and lubricating oil consumption, both being most important in the internal combustion engine, substantially prevented, but also the operation of the engine can be maintained in a superior condition for a longer period of time.

According to the second embodiment of the present invention, the cross-sectional configuration of the oil scraping piston ring main body 1 is so formed that the inner surface thereof is not vertical as was the case of the first embodiment, but is inclined radially outwardly and upwardly or downwardly as shown in FIGS. 5 and 6. Also, according to the second embodiment, the thin steel strip is provided with a plurality of oil passing slits as in the case of the first embodiment but is bent into an L-shape as is best seen in FIG. 7 and rounded into a ring form so that an L-shaped compression element having an obliquely rising portion and a radially outwardly extending horizontal portion is obtained.

At the time the oil scraping piston ring is inserted into a piston groove, the above-described obliquely rising portion of the L-shaped compression element lies along the inclined rear side surface of the oil scraping piston ring in full contact therewith and the radially outwardly extending horizontal portion of the compression element contacts with either the upper or lower surface of the piston groove. The second embodiment of the present invention will now be described in more detail with reference made to FIGS. 5 through 7.

As described above, the oil scraping piston ring main body 19 is made of cast iron so formed that the rear surface 10 thereof is inclined and extends radially outwardly and downwardly as shown in FIG. 5, or extends radially outwardly and upwardly as shown in FIG. 6. While the oil scraping piston ring main body 19 is thus formed, a thin steel strip provided with a number of rectangular oil passing slits 11 of equal size and shape and alternately opening to either one of the sides 10, 10 of the steel strip as shown in FIG. 3 is bent along an x—x line as described before so that an L-shaped cross-sectional configuration is obtained. The steel strip, thus formed, is then cut into a suitable length and rounded into a ring form, and the ends of the steel strip abuts together so that an L-shaped compression element having an obliquely rising portion 21 and a horizontally and radially outwardly extending portion 22 as best seen in FIG. 7 can be obtained.

The oil scraping piston ring is inserted into the piston groove after the L-shaped compression element L is at first inserted interior or rear side of the piston ring, in such a manner that the obliquely rising portion 21 of the compression element L lies along the inclined rear surface 20 of the piston ring and the horizontally extending portion 22 thereof abuts the upper or lower surface of the piston groove. To be more specific, when the horizontally extending portion 22 of the L-shaped compression element is so placed as to abut the lower surface 18 of the piston groove 3 and the obliquely rising portion 21 thereof lies along the downwardly inclined rear surface 20 of the piston ring main body as shown in FIG. 5, the piston ring main body 19 is urged upwardly, by the resilience of the compression element so that the upper surface 16 of the piston ring main body 19 is forced into tight contact with the upper surface 17 of the piston groove. Simultaneously, the piston ring main body 19 is urged outwardly by the action of the compression element so that the compressive force acting between the sliding surface 8 of the piston ring main body 19 and the inside surface 6 of the cylinder is further strengthened.

On the contrary, when the horizontally extending portion 22 of the L-shaped compression element is placed so as to abut the upper surface 17 of the piston groove 3 and the obliquely rising portion 21 thereof lies along the upwardly inclined rear surface 20 of the piston ring main body as is indicated in FIG. 6, the piston ring main body 19 is urged downwardly by the resilience of the rising portion 21 of the L-shaped compression element L so that the lower surface 15 of the piston ring main body is forced to contact the lower surface 18 of the piston groove. Simultaneously, it is urged radially outwardly, toward the inside surface 6 of the cylinder under the action of the same portion of the compression element, whereby the compressive force therebetween is further strengthened.

In this case, if the upper, lower and rear surfaces of the oil scraping piston ring main body 19 have an applied layer of tetrafluoroethylene resin or hard chrome plating similar to that shown in FIG. 8 for the first embodiment of the present invention, advantageous results as described with respect to that embodiment can also be obtained. Furthermore, as a result of inclining the rear side surface of the oil scraping piston ring in the second embodiment of the invention, if there exists a possibility of causing deflection in the principal axis of inertia thereof, such a deflection may be compensated for by providing a balancing cut at a suitable position of the piston ring main body 19.

When the piston ring and the compresion element are composed in accordance with the second embodiment of the invention, the inclined rear surface of the piston ring main body is urged outwardly by the obliquely rising portion of the L-shaped compression element, and the upper or lower surface of the oil scraping piston-ring main body is constantly urged toward the upper or lower surface of the piston groove. As a result, a clearance $g$ is the case of the conventional piston ring as illustrated in FIG. 9(a) will not be created at the lower surface of the piston ring main body while the piston is descending even though the piston moves up and down at a high speed. Likewise a clearance, such as $g$ created in the case of the conventional piston ring illustrated in FIG. 9(b) will not appear at the upper surface of the piston ring main body while the piston is rising, whereby any possibility of intrusion of lubricating oil into the combustion chamber, due to the so-called "pumping action" is eliminated.

Furthermore, because the compressive force between the sliding surface of the oil scraping piston ring and the inside surface of the cylinder is strengthened, there is no fear of the lubricating oil leaking through the sliding contact surfaces into the combustion chamber. Thereby, not only the reduction of the output capacity of the internal combustion engine due to the intrusion of the lubricating oil into the chamber and the increase of the lubricating oil consumption, both being the important features of the internal combustion engine are substantially prevented, but the advantageous effect of maintaining the engine in good operating condition for a long period is also obtained. Since the construction of the piston ring and compression element according to the present invention is extremely simple and economical in manufacture, it turns out to be another advantageous feature of the invention when utilized in the industry.

What is claimed is:

1. An oil scraping piston-ring assembly for use in a piston vertically reciprocating within a cylinder and having a peripheral groove formed therein, said assembly comprising: an oil scraping piston ring main body having an inner surface perpendicular to the upper or lower surface thereof, a compression element made of a steel stirp, having a plurality of oil passing slits therein bent into a V-shaped cross-sectional configuration, and rounded into a ring, said compression element and said oil scraping piston ring main body being positioned within said groove such that a vertically rising portion and a radially outwardly oblique portion of said compression element is respectively biased into contact with the inner side surface and either the upper or lower surface of the oil scraping piston ring main body.

2. An oil scraping piston-ring assembly as defined in claim 1 wherein said oil scraping piston-ring main body is coated with a layer of tetrafluoroethylene resin or hard chrome plating on the upper, lower and inner surfaces thereof.

3. An oil scraping piston-ring assembly for use in a piston vertically reciprocating within a cylinder and having a peripheral groove formed therein, said assembly comprising: an oil scraping piston ring main body having an inner surface inclined radially outwardly toward the lower or upper surface of the oil scraping piston ring main body, and a compression element made of a steel strip, having a plurality of oil passing slits, bent into an L-shaped cross-sectional configuration, and rounded into a ring to form an L-shaped compression element, said compression element and said piston ring main body being inserted with said groove such that said obliquely rising portion of the compression element lies along the inclined inner side surface of the oil scraping piston ring main body and the radially extended horizontal portion thereof contacts the lower or upper surface of the piston groove to bias the ring into full surface contact with the cylinder wall and one surface of said piston groove.

4. An oil scraping piston-ring assembly as defined in claim 3 wherein said oil scraping piston ring main body is coated with a layer of tetrafluoroethylene resin or hard chrome plating on the upper, lower and inner surfaces thereof.

References Cited
UNITED STATES PATENTS

| | | | |
|---|---|---|---|
| 2,785,029 | 3/1957 | Davis | 277—143 X |
| 2,789,022 | 4/1957 | Olson | 277—143 X |
| 2,855,254 | 10/1958 | Beck et al. | 277—143 |
| 2,859,079 | 11/1958 | Olson | 277—143 X |

ROBERT I. SMITH, Primary Examiner